Patented Aug. 7, 1951

2,562,897

UNITED STATES PATENT OFFICE 2,562,897

COPOLYMERS OF VINYL CHLORIDE, ALLYL GLYCIDYL ETHER, AND ALLYL ESTERS OF HYDROXYALKANOIC ACIDS

Ellsworth K. Ellingboe, Wilmington, Del., assignor to E. I. du Pont de Nemours and Company, Wilmington, Del., a corporation of Delaware No Drawing. Application May 6, 1950,
Serial No. 160,581

8 Claims. (Cl. 260—78.3)

This invention relates to polymeric materials and, more particularly, to certain new thermosetting polymers.

Many coating or molding compositions based on vinyl chloride polymers and copolymers have been described and some have achieved commercial success. However, in spite of their economic and technical advantages, the prior compositions leave much to be desired in respect to certain important properties such as initial solubility, final film insolubility and non-thermoplasticity, heat resistance, and hardness. In particular, the vinyl chloride polymer compositions heretofore known are not readily amenable to heat-curing (i. e., insolubilization upon heat treatment) and they lack thermal stability, as evidenced by the embrittlement, discoloration, and general decomposition they undergo when subjected to heat and/or light. There was a need for a thermosetting film-forming composition having the desirable properties of copolymers of vinyl chloride, but which would also offer the advantage of good initial solubility coupled with heat curability to an insoluble, heat-resistant, print-resistant, hard film.

An object of the present invention is to provide a new film-forming, heat curable copolymer. A further object is to provide such a copolymer which is initially soluble in common organic solvents but which is readily converted by heat curing to an insoluble product characterized by excellent thermal stability and stability to light. A still further object is to provide such a copolymer which, upon heat curing, will give a heat-resistant, print-resistant, hard film. Other objects will be apparent from the description of the invention given hereinafter.

The above objects are accomplished according to the present invention by providing a copolymer, the polymeric components of which essentially consist of, by weight, 70%–85% polymerized vinyl chloride, 4%–28% polymerized allyl glycidyl ether, and 2%–26% of a polymerized allyl ester of a mono (primary hydroxy) alkanoic acid of two to six carbon atoms, inclusive. This copolymer may be prepared by subjecting to polymerization conditions a mixture of the three monomeric components.

In a more preferred form, the proportion, by weight, of polyvinyl chloride in the copolymer is between 75% and 82%, that of the allyl glycidyl ether between 5% and 8%, and that of the allyl ester of the hydroxyalkanoic acid between 12% and 18%. These preferred proportions give the best cures with mild curing agents and optimum coating properties. Thus, the preferred ratios (by weight) of the allyl hydroxyalkanoate to allyl glycidyl ether are between 3.6:1 and 1.5:1, as the best coatings are obtained with copolymers within these ratios. However, satisfactory results are obtained within the entire range, i. e., when the weight ratio of allyl hydroxyalkanoate to allyl glycidyl ether ranges from 6.5:1 to 1:14.

Although the copolymerization of vinyl chloride with certain other polymerizable compounds, including allyl glycidyl ether, has been proposed heretofore, it has now been found that the combination of allyl glycidyl ether with the aforementioned allyl esters of hydroxyalkanoic acids is unexpectedly outstanding in its polymerization behavior with vinyl chloride and in its ability to impart stability to heat and light, as well as heat curability and other desirable properties to the resulting copolymer, when used in the proportions stated.

Allyl glycidyl ether, which has the formula

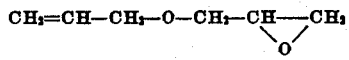

is a liquid boiling at 87.5–88° C., at 80 mm. pressure, $n_D^{20}$ 1.4345, $d_4^{20}$ 0.9678. It may be prepared by dehydrohalogenation of the corresponding chlorohydrin, as described in U. S. Patent 2,314,039.

The third essential component of the polymerization mixture is an allyl ester of a hydroxyalkanoic acid of two to six carbon atoms, in which the hydroxyl group is primary, i. e., attached to a —CH$_2$— group. Among the suitable allyl esters may be mentioned allyl glycolate, allyl beta-hydroxypropionate, allyl gamma-hydroxybutyrate, allyl delta-hydroxyvalerate, allyl epsilon-hydroxycaproate, allyl beta-hydroxyisobutyrate, allyl alpha,alpha-dimethyl-beta-hydroxypropionate, and the like. The preferred compounds are the allyl esters of hydroxyalkanoic acids of the formula HO—(CH$_2$)$_n$—COOH where $n$ is an integer from 1 to 5, inclusive.

The chief beneficial result observed by introduction of the third component, i. e., the allyl hydroxyalkanoate, into the copolymer lies in the fact that heat curability (insolubilization) of the polymers is greatly improved thereby. One advantage resulting from this fact is that the polymers can be insolubilized at lower temperatures than is possible in the absence of the allyl hydroxyalkanoate, thus minimizing the danger of heat discoloration in industrial practice. In addition, the preferred compositions, containing 12-18% of polymerized allyl hydroxyalkanoate, have the advantage of superior versatility in that they can be heat-cured with mild, non-acidic agents such as urea-formaldehyde resins, which do not give complete cure with vinyl chloride/allyl glycidyl ether copolymers. This results in a further improvement in heat stability, since urea-formaldehyde resins or similar resins tend to improve the inherent thermal stability of the copolymers of this invention.

The invention is illustrated in greater detail in the following examples in which parts are by weight unless otherwise noted.

*Example I*

A stainless steel reactor was swept with oxygen-free nitrogen and charged with 120 parts of allyl glycidyl ether, 30 parts of allyl beta-hydroxypropionate, 350 parts of benzene, 6 parts of alpha,alpha'-azodiisobutyronitrile, 0.55 part of maleic anhydride, and 8 parts of tert.-butyl alcohol. The reactor was then evacuated to a pressure of 90–100 mm., closed, cooled in a solid carbon dioxide-acetone bath, and charged with 350 parts of vinyl chloride, introduced by distillation. The reactor was heated to 60° C., and maintained at that temperature for 12 hours with agitation. After cooling to room temperature, the residual pressure was released slowly, and the benzene solution of the reaction product was poured into a 4- to 6-fold volume of methanol, whereupon the polymer coagulated. It was separated, air-dried, and redissolved in acetone. The acetone solution was poured into methanol and the precipitated polymer was filtered and dried at reduced pressure. There was obtained 118 parts of vinyl chloride/allyl glycidyl ether/allyl beta-hydroxypropionate copolymer containing 80% vinyl chloride (chlorine: 45.48% by analysis) and approximately 13% allyl glycidyl ether, as calculated from epoxide oxygen determinations.

This copolymer showed exceptional heat and light stability in comparative tests with a commercial vinyl chloride/vinyl acetate copolymer containing 87% of vinyl chloride. Coatings about 1–2 mil thick of each polymer on phosphate-treated steel were prepared. Upon baking the vinyl chloride/allyl glycidyl ether/allyl beta-hydroxypropionate polymer coatings for 30 minutes at temperatures of 205° C., there was no evidence of disintegration or discoloration, whereas the vinyl chloride/vinyl acetate copolymer coatings began to blacken when heated 30 minutes at temperature of 149° C., and were quite black and disintegrated in 30 minutes at 177° C. In comparative light stability tests under a carbon arc, the vinyl chloride/allyl glycidyl ether/allyl beta-hydroxypropionate copolymer coatings showed no visible change in one month, while the vinyl chloride/vinyl acetate copolymer coatings were severely darkened and embrittled within two weeks.

The copolymer of this example could be partially cured (i. e., insolubilized) by baking at 205° C., in the absence of curing agents. Complete insolubility in organic solvents was obtained by blending the polymer with 0.1–0.15% of zinc chloride, and baking for 30 minutes at 149° C. The resulting coatings were tough, flexible, and insoluble in either aromatic hydrocarbons (benzene, xylene) or ketones (acetone, methyl isopropyl ketone) or their mixtures.

The beneficial influence of the allyl beta-hydroxypropionate is shown by the fact that a vinyl chloride/allyl glycidyl ether copolymer nearly identical in composition except for the omission of the allyl beta-hydroxypropionate, and prepared under the same conditions, required from 2 to 3 times the amount of curing catalyst to achieve the same degree of cure at the same temperature as the three-component copolymer of this example. Conversely, with the same amount of curing catalyst, the three component copolymer required a temperature of only 121° C., for complete cure as compared with 149° C., for the copolymer not containing any allyl beta-hydroxypropionate.

*Example II*

A stainless steel reactor was charged under nitrogen atmosphere with 60 parts of allyl glycidyl ether, 120 parts of allyl beta-hydroxypropionate, 262 parts of thiophene-free benzene, and 6 parts of alpha,alpha'-azodiisobutyronitrile. The reactor was then evacuated to a pressure of 90–100 mm., closed, cooled in a solid carbon dioxide-acetone mixture and charged with 420 parts of vinyl chloride introduced by distillation, and heated at 60° C., with agitation for 18 hours. The product of this run was composited with the product of four other identical runs and the polymer from this composite run was isolated as in Example I. There was obtained 1091 parts of a white solid copolymer which contained 79.1% by weight of polyvinyl chloride, as indicated by its chlorine content of 44.94%, and 6.2% of polymerized allyl glycidyl ether, as shown by epoxide oxygen determination. A 30% solution of the polymer in cyclohexanone had a viscosity of 4.0 poises at 25° C.

This copolymer showed superior heat and light stability in comparison with a commercial vinyl chloride/vinyl acetate copolymer containing 87% vinyl chloride when tested in the form of coatings of 1–2 mil thickness on phosphate-treated steel. On baking the vinyl chloride/allyl glycidyl ether/allyl beta-hydroxypropionate copolymer coatings for 30 minutes at 177° C., there was no evidence of deterioration, whereas the vinyl chloride/vinyl acetate copolymer coatings began to blacken when heated 30 minutes at 149° C., and were quite black and disintegrated in 30 minutes at 177° C.

The copolymer of this example was partially insolubilized by baking at 177° C., in the absence of any curing agent. When blended with 2% of a butanol-modified urea-formaldehyde resin and 0.5% citric acid, tough, insoluble coatings were obtained on baking 30 minutes at 121° C., to 150° C.

*Example III*

The following mixture was treated according to the procedure of Example II at a reaction temperature of 60°–63° C., and a maximum pressure of 60 lb./sq. in. for 12 hours: 179 parts of vinyl chloride, 60 parts of allyl glycidyl ether, 15 parts of allyl glycolate, 175 parts of thiophene-free benzene, 3 parts of alpha,alpha'-azodiisobutyronitrile, 0.25 part of maleic anhydride, and 4 parts of tert.-butyl alcohol. There was obtained 61 parts of a vinyl chloride/allyl glycidyl ether/allyl glycolate copolymer containing 82% vinyl chloride, as shown by its chlorine content of 46.6%, and 12.8% allyl glycidyl ether, as shown by epoxide oxygen determination. This copolymer was similar to the product of Example I in thermal stability, solubility, and curing properties.

*Example IV*

The following mixture was treated according to the procedure of Example II at 60° C., for 12 hours: 280 parts of vinyl chloride, 40 parts of allyl glycidyl ether, 80 parts of allyl glycolate, 400 parts of thiophene-free benzene and 4.8 parts of alpha,alpha'-azodiisobutyronitrile. There was obtained 123.4 parts of a vinyl chloride/allyl glycidyl ether/allyl glycolate copolymer having a viscosity of 0.062 poise in a 10% solution in cyclohexanone at 25° C. Analysis showed a chlorine content of 43.9%, corresponding to a vinyl chloride content of 77.5%, and an epoxide-oxygen content of 1.1%, corresponding to an allyl glycidyl ether content of 7.8%.

Enamels were prepared from samples of this coplymer at 50% total solids, consisting of 10 parts of copolymer, 7 parts of rutile titanium dioxide pigment, 0.34 part of a butanol-modified urea-formaldehyde resin, and 17.4 parts of a solvent mixture of equal parts of xylene and methyl isobutyl ketone. A 1-2 mil coating of this enamel applied to a phosphatized steel panel and baked for 30 minutes at 135° C., was thermoset and exhibited good color, heat sLability, gloss, flexibility, toughness, organic solvent insolubility, and resistance to hot soap solutions.

It will be understood that the above examples are merely illustrative and that the present invention broadly resides in a new copolymer, the polymeric components of which essentially consist of, by weight, 70%-85% polymerized vinyl chloride, 4%-28% polymerized allyl glycidyl ether, and 2%-26% of a polymerized allyl ester of a mono(primary hydroxy) alkanoic acid of two to six carbon atoms, inclusive.

Although the instant copolymers essentially consist of the three components described above and in the proportions recited, there may be included other copolymerized ingredients in minor amount up to about 25% by weight of the total polymeric material. Such other ingredients do not materially affect the basic and novel characteristics of these copolymers but tend to modify certain properties advantageously for specific uses. These other ingredients may be the polymerization products of any unsaturated compound copolymerizable with vinyl chloride, preferably a monoethylenic compound having a terminal methylene group attached by a double bond to the rest of the molecule. Examples of such compounds are ethylene, isobutylene, vinyl trimethylacetate, methyl methacrylate, acrylonitrile, dimethyl fumarate, allyloxyethanol, glyceryl alpha-monoallyl ether, allyl ethers of glycerol monochlorohydrin, di(beta-hydroxyethyl)-maleate, vinylidene chloride, tetrafluoroethylene, etc.

The copolymers of this invention may also have combined with them various extraneous non-polymerizable adjuvants such as dyes, pigments, reinforcing agents, fillers, plasticizers, stabilizers, oils, etc. Polymeric modifiers such as non-drying oil-modified alkyd resins, or various vinyl chloride copolymers, are especially useful.

The copolymers of this invention may be prepared by polymerizing together and in suitable proportions vinyl chloride, allyl glycidyl ether, and an allyl hydroxyalkanoate as above defined, alone or with one or more additional polymerizable components in minor amount. The proportions of polymerized allyl glycidyl ether and allyl hydroxyalkanoate in the resulting polymer are fairly close to their relative proportions in the monomeric mixture, but the vinyl chloride has a tendency to polymerize somewhat faster than the other components and therefore to appear in the polymer in somewhat greater proportion than in the monomeric mixture. While the actual composition of the copolymer depends on the conversion and the method of polymerization, there is usually from 5% to 10% more vinyl chloride in the copolymer than in the monomer mixture, or sometimes up to about 20% more, particularly when the low temperature polymerization initiators discussed below are used. As a general rule, copolymers within the desired range of proportions of the three components are obtained from monomer mixtures containing, by weight, from 50% to 80% of vinyl chloride, from 5% to 47% of allyl glycidyl ether and from 3% to 45% of allyl hydroxyalkanoate.

The preferred polymerization initiators are those of the free-radical generating type such as organic or inorganic peroxides, e. g., hydrogen peroxide, benzoyl peroxide, lauroyl peroxide, tert.-butyl hydroperoxide, diethyl peroxide, and the like; or the persalts such as ammonium, potassium, or sodium persulfates, perborates, or percarbonates, with or without reducing adjuvants such as sulfur dioxide, sodium sulfite, sodium hydrosulfite, etc.; or the azo compounds described in Hunt U. S. Patent 2,471,959, e. g., the azonitriles such as alpha,alpha'-azodiisobutyronitrile; alpha,alpha'-azobis(alpha,gamma-dimethylvaleronitrile); dimethyl alpha,alpha'-azodiisobutyrate; 1,1'-azodicyclohexanecarbonitrile and the like. The azonitrile initiators are preferred in the production of the copolymers of this invention since they give products having the best thermal stability. Excellent initiators for use in aqueous systems are the following recently proposed combinations: a water soluble metal thiocyanate with hydrogen peroxide or an organic hydroperoxide (as disclosed in application Serial No. 138,525, filed by E. G. Howard on January 13, 1950); and a hydrazobisalkanesulfonic acid, such as sodium hydrazobismethanesulfonate, with hydrogen peroxide and a cupric or ferric ion (as disclosed in application Serial No. 141,867, filed by E. G. Howard on February 1, 1950). These systems are effective at remarkably low temperatures, e. g., between $-25°$ and $+40°$ C. The catalyst need be used only in minor amounts, e. g., between 0.01 and 5% based on the weight of the total polymerizable materials.

The polymerization may be carried out under a variety of conditions. While a solvent is not essential, it is convenient in practice to use a liquid medium which dissolves the monomers and catalysts. Any inert solvent may be used, including those which are also solvents for the polymer, e. g., aromatic hydrocarbons such as benzene, toluene, and the xylenes, or ketones such as acetone, methyl isobutyl ketone, cyclohexanone, etc., and those which do not dissolve the polymer, such as methanol, ethanol, butanol, tert.-butyl alcohol, acetic acid, aliphatic hydrocarbons, etc. Alternatively, the polymerization may be carried out in aqueous systems, with or without dispersing or emulsifying agents.

The polymerization mixture may include ingredients such as tert.-butyl or tert.-amyl alcohols which generally act as buffers in vinyl chloride polymerization to neutralize the hydrogen chloride which may be formed, or maleic anhydride which often confers better adhesive properties. However, these adjuvants are by no means necessary since allyl glycidyl ether itself acts as a buffer and since the allyl glycidyl ethyl/vinyl chloride/allyl hydroxyalkanoates copolymers themselves have excellent adhesive properties.

The polymerization temperature is not critical. At low temperatures, e. g., 0-10° C., the reaction is rather slow except when the low temperature initiators mentioned above are employed in which case the reaction may be carried out even at temperatures as low as −25° C. It is usually expedient to operate at temperatures above 25° C., and preferably between 40 and 100° C. In view of the volatility of vinyl chloride, it is desirable to use sealed reactors. The reaction may be carried out under the autogenous pressure of the reactants at the reaction temperature but, if desired, additional pressure may be applied, e. g., vinyl chloride pressure, or that of an additional gaseous monomer such as ethylene, or that of an inert gas such as nitrogen.

The reaction product is obtained as a colorless or light-colored solid copolymer, which has the advantage of ready solubility in many common solvents, particularly the aromatic mononuclear hydrocarbons and the aliphatic or alicyclic ketones. These polymers may be cured, that is, rendered insoluble in the same solvents, by means of a heat treatment at temperatures between about 120° C., and 250° C., for periods varying, depending on the temperature, between 10 and 45 minutes. However, the heat-curing or thermosetting of the resins is preferably carried out with the aid of small amounts, from 0.1 to 5% by weight, of curing or thermosetting agents. Preferably, the curing agents are organic solvent-soluble urea-formaldehyde or melamine-formaldehyde resins, which may be used as such or in conjunction with an acidic catalyst. With the help of such agents it is possible to insolubilize the resins at lower temperatures, for example by heating at 100 to 175° C., for 10 to 20 minutes; or, alternatively, at higher temperatures, such as 140-250° C., but in less time than is possible at the same temperature without a curing agent. After complete curing, the resins are substantially insoluble in and unaffected by the common solvents, including those, such as aromatic hydrocarbons or ketones, which dissolved them before the heat treatment.

The polymers of this invention are particularly useful in the coating and impregnating of porous surfaces such as textiles, e. g., cotton fabrics or regenerated cellulose fabrics, paper, wood, brick, etc., and in the coating of non-porous surfaces such as iron, steel, glass, and the like. They are also useful in such applications as wire coating and can coating, and the preparation of molded and extruded articles, adhesives, unsupported films, fibers, and the like.

As many apparently widely different embodiments of this invention may be made without departing from the spirit and scope thereof, it is to be understood that the invention is not limited to the specific embodiments thereof except as defined in the appended claims.

The invention claimed is:

1. A copolymer, the polymeric components of which essentially consist of, by weight, 70%–85% polymerized vinyl chloride, 4%–28% polymerized allyl glycidyl ether, and 2%–26% of a polymerized allyl ester of a mono(primary hydroxy)-alkanoic acid of two to six carbon atoms, inclusive.

2. A copolymer as recited in claim 1 wherein said allyl ester of a mono(primary hydroxy)alkanoic acid is an allyl ester of an hydroxyalkanoic acid of the formula $HO-(CH_2)_n-COOH$ where $n$ is an integer from 1 to 5, inclusive.

3. A copolymer as recited in claim 1 wherein said allyl ester of a mono(primary hydroxy)alkanoic acid is allyl glycolate.

4. A copolymer as recited in claim 1 wherein said allyl ester of a mono(primary hydroxy)alkanoic acid is allyl beta-hydroxypropionate.

5. A copolymer, the polymeric components of which essentially consist of, by weight, 75%–82% polymerized vinyl chloride, 5%–8% polymerized allyl glycidyl ether, and 12%–18% of a polymerized allyl ester of a mono(primary hydroxy)alkanoic acid of two to six carbon atoms, inclusive.

6. A copolymer as recited in claim 5 wherein said allyl ester of a mono(primary hydroxy)alkanoic acid is an allyl ester of an hydroxyalkanoic acid of the formula $HO-(CH_2)_n-COOH$ where $n$ is an integer from 1 to 5, inclusive.

7. A copolymer as recited in claim 5 wherein said allyl ester of a mono(primary hydroxy)alkanoic acid is allyl glycolate.

8. A copolymer as recited in claim 5 wherein said allyl ester of a mono(primary hydroxy)alkanoic acid is allyl beta-hydroxypropionate.

ELLSWORTH K. ELLINGBOE.

REFERENCES CITED

The following references are of record in the file of this patent:

UNITED STATES PATENTS

| Number | Name | Date |
| --- | --- | --- |
| 2,450,234 | Evans et al. | Sept. 28, 1948 |
| 2,464,741 | Adelson | Mar. 15, 1949 |
| 2,470,324 | Staudinger et al. | May 17, 1949 |